United States Patent [19]
Balling et al.

[11] 3,810,999
[45] May 14, 1974

[54] MODIFICATION OF AQUEOUS COFFEE AROMA

[75] Inventors: T. Thomas Balling, Danbury, Conn.; James P. Mahlmann, Wayne, N.J.

[73] Assignee: General Foods Corporation, White Plains, N.Y.

[22] Filed: May 12, 1972

[21] Appl. No.: 252,777

[52] U.S. Cl. .............................. 426/362, 426/388
[51] Int. Cl. .............................................. A23f 1/08
[58] Field of Search ...................... 99/65, 71, 140 R

[56] References Cited
UNITED STATES PATENTS 3,421,901  1/1969  Mahlmann et al. ................... 99/71
3,615,665  10/1971  White et al. ........................ 99/71 X
2,947,634  8/1960  Feldman et al. ...................... 99/71

Primary Examiner—Frank W. Lutter
Assistant Examiner—William L. Mentlik
Attorney, Agent, or Firm—Thomas R. Savoie; Daniel J. Donovan; Bruno P. Struzzi

[57] ABSTRACT

Aqueous aromas are obtained from roasted coffee such as by contacting roasted and ground coffee with steam. The evolved aqueous aromas are preferably condensed and then partitioned with a glyceride such as a vegetable oil. The separate water and glyceride phases are used to aromatize soluble coffee products such as by adding the water phase to coffee extract and then drying the extract.

3 Claims, No Drawings

MODIFICATION OF AQUEOUS COFFEE AROMA

BACKGROUND OF THE INVENTION

The production and use of aqueous coffee aromas has been a subject of interest to the coffee art for some time. U.S. Pat. Nos. 2,562,206 to Nutting, 3,132,947 to Mahlman, 3,244,521 to Clinton et al., 3,421,901 to Mahlmann et al., 3,532,507 to Cascione and 3,615,665 to White et al. are among the patents which deal with steamed coffee aromas.

The types of steam aromas disclosed in the above-mentioned patents are examples of the aromas which may be modified and improved by means of this invention. The method of this invention is specifically illustrated with reference to commonlyassigned U.S. Pat. No. 3,615,665 and to U.S. Pat. application, Ser. No. 161,327, filed July 9, 1971, which is a continuation-in-part of the aforementioned patent.

Both the above mentioned patent and application, hereby incorporated by reference, are entitled "Confined Volume Coffee Aroma" and are directed to a method for removing coffee volatiles from roasted and ground coffee by subjecting the coffee to the influence of steam, under pressure, in an isolated column or vessel. The volatiles are taught to be condensed and added to coffee extract or alternatively to be condensed in coffee extract. The extract is then dried.

SUMMARY OF THE INVENTION

It has now been found that if the condensate collected from aqueous coffee aromas, such as from a confined volume aroma coffee process, is partitioned by means of a glyceride, such as vegetable oil, the water phase contains highly desirable buttery flavor components without certain of the harsh notes characteristic of the total condensate. This water phase aroma may be added to coffee extract which is then dried by standard techniques such as spray drying, freeze drying, etc. Alternatively the water phase may be combined with dry soluble coffee as a means of aromatizing the soluble coffee product.

The oil phase, which is deemed acceptable by a significant percentage of coffee consumers, may be used to modify the character of the soluble coffee. The oil phase condensate is useful to aromatize the dehydrated soluble coffee and may also be used to modify the flavor and aroma of the final coffee beverage by being added back to the extract at levels other (usually less) than the amount that corresponds to the added water phase.

DESCRIPTION OF THE INVENTION

This invention provides a means by which aqueous coffee aromas can be modified. When an aqueous aroma condensate is combined with a glyceride, such as an oil, and is separated into distinct water and glyceride phases, the flavor and aroma of the two phases are noticeably different and each phase may be more or less preferred by particular consumers. Since the two phases are separated they may be combined with coffee extract either liquid or dehydrated separately or in combination in order to produce a particular flavor-aroma effect which is found desirable by a particular consumer or group of consumers.

A typical aqueous coffee aroma for use in this invention is obtained by steaming roasted and ground coffee at a moisture level of less than 40 percent in a confined vessel under pressure. Steam pressure is built up and maintained in the vessel either by introducing steam into the vessel and isolating the vessel at a predetermined pressure or by pre-wetting the roasted coffee to the desired moisture level, closing the vessel and applying external heat to the isolated vessel. The moisture in the coffee is in intimate contact with the aroma and flavor constituents through the coffee, and when the pressure is relieved by venting, aroma and flavor volatiles are carried out of the zone with the escaping vapors. The aromatic and flavor volatiles are recovered in a condenser system. Suitable operating conditions for producing and collecting this condensate are described in the afore-mentioned "Confined Volume Coffee Aroma" patent and application.

The aqueous aroma condensate, which is typically only a partial condensate of the escaping volatiles (I.e. some volatiles passing through the condenser system uncondensed), is throughly mixed with the liquid glyceride. The mixing step is preferably conducted under an inert atmosphere and usually at a temperature between 35°F and 150°F, it being recognized that by varying mixing conditions, such as temperature and time, changes in the aroma and/or flavor of the condensate may be produced. The mixture is then caused to separate into distinct aqueous and glyceride phases either by standing or by mechanical means such as centrifugation.

The aqueous phase which has been found to contain pleasant buttery notes may then be added to coffee extract and dried. Usually the extract to which the aqueous phase condensate is added will be extract obtained from roasted coffee from which the coffee aroma has been removed. When the aqueous phase condensate is added to coffee extract and dried, such as by freeze drying or spray drying, it has been found that liquid coffee beverages prepared from the enhanced soluble coffee product will likewise exhibit a pleasant buttery flavor note.

The glyceride phase condensate is also found to possess some desirable volatiles and has been found useful as a means to aromatize the soluble coffee product, such as by spraying all or a portion of the enhanced glyceride onto the surface of the dry soluble coffee, preferably under an inert atmosphere. In order to adjust the flavor of the final coffee to the taste of some consumers it is possible to add the enhanced glyceride to the liquid extract. Usually this will be done by adding a portion of the total available glyceride phase to the liquid extract together with a relatively larger, (basis per cent of available) amount of the water phase.

By means of one embodiment of this invention desirable water-soluble flavor constituents are incorporated into the extract where they will be retained or fixed until the dried extract is reconstituted. The oil-soluble volatiles, which are difficult to disperse in an aqueous medium may then be used to aromatize the dry soluble product. It has also been postulated that partitioning of aqueous aroma condensate into separate water and oil phases has the additional advantage of preventing the development of undesirable flavor notes which have been found to be present in the total condensate.

According to another embodiment of this invention all or a portion of the water phase could be plated on the dry soluble coffee powder. Usually this will be done in conjunction with plating all or a portion of the glyceride phase on the dry powder. Additionally it may be desirable to concentrate the water phase before combining it with the dehydrated extract.

This invention is further described but not limited by the following examples.

EXAMPLE 1

One hundred and five pounds of roasted and ground coffee at a moisture content of 7 percent were charged into a stainless steel insulated column (8 inches diameter by 14 feet) which had been preheated to a temperature of 350°F. Steam at 40 p.s.i.g. was fed into the bottom of the column to heat the coffee and flush out the air through a vent line at the top of the column. After 1 ½ minutes the gases exiting from the vent line had a temperature of about 240°F. and the vent valve was closed. The pressure in the column was raised to 30 p.s.i.g. by continuing to feed steam into the column for about 1 minute. The column was then isolated by closing off the steam line and the coffee was maintained under pressure for 2 minutes. The top vent valve was then opened and the volatile coffee constituents and water vapor allowed to pass into a condenser which was maintained at 45°F with chilling water. The flow of vapors continued for 2 minutes before the pressure in the column was reduced to atmospheric pressure and condensate was collected at a temperature of from 75° to 65°F. as it came out of the condenser. The condensate was vigorously shaken in a separatory funnel with an equal volume of refined cottonseed oil and then allowed to separate over a period of several hours. The aqueous phase, which was noted as having lost the pinkish hue that was present in the starting condensate, was drawn from the funnel and organoleptically evaluated as having pleasant buttery flavor notes.

EXAMPLE 2

Coffee treated as in Example 1 was extracted in a typical soluble coffee extraction process. The aqueous phase condensate obtained in Example 1 was added to this extract at a level of one part by weight of condensate to thirty parts of coffee solids and the mixture was freeze dried according to conventional techniques. The resultant soluble coffee is significantly enhanced and is considered noticeably different in flavor to similar soluble coffee beverages prepared with the total amount of unpartitioned confined volume aroma condensate.

EXAMPLE 3

Soluble coffee was prepared as in Example 2 with the addition to the extract of one-half part of the oil phase condensate together with the one part of aqueous phase condensate. Coffee beverages produced from the thus prepared soluble coffee were found to be different and in some instances preferred to the beverages of Example 2.

Having thus described the invention what is claimed is:

1. A method for enhancing soluble coffee products comprising the steps of:
   a. obtaining a steam aroma from roasted coffee by contacting roasted and ground coffee with steam in an isolated vessel for from 15 seconds to 10 minutes, at a pressure of from 10 to 100 psig.,
   b. condensing at least a fraction of the steamed coffee aroma,
   c. mixing the condensate with a vegetable oil,
   d. separating the mixture into an oil phase and a water phase,
   e. combining the water phase with liquid coffee extract,
   f. drying the liquid extract,
   g. combining at least a portion of the oil phase with the dehydrated extract.

2. The method of claim 1 wherein a portion of the glyceride phase is added to the liquid coffee extract.

3. The method of claim 2 wherein the liquid glyceride is a cottenseed oil.

* * * * *